United States Patent [19]

Tayloe

[11] Patent Number: 5,539,921
[45] Date of Patent: Jul. 23, 1996

[54] APPARATUS FOR REDUCING RING-ALERT POWER AND METHOD THEREFOR

[75] Inventor: Daniel R. Tayloe, Phoenix, Ariz.

[73] Assignee: Motorola, Inc., Schaumburg, Ill.

[21] Appl. No.: 311,223

[22] Filed: Sep. 23, 1994

[51] Int. Cl.$^6$ .............................. H04B 7/185; H04Q 7/22
[52] U.S. Cl. ...................... 455/13.3; 455/13.4; 455/33.1; 455/38.3
[58] Field of Search .................................. 455/12.1, 13.1, 455/13.3, 13.4, 25, 33.1–33.4, 51.2, 54.1, 54.2, 38.3, 343; 379/59

[56] References Cited

U.S. PATENT DOCUMENTS 5,404,569  4/1995  Schwendeman et al. ......... 455/13.1 X

FOREIGN PATENT DOCUMENTS

91/07023  5/1991  WIPO ................................ 455/12.1
94/05093  3/1994  WIPO ................................ 455/12.1

*Primary Examiner*—Chi H. Pham
*Attorney, Agent, or Firm*—Gregory J. Gorrie

[57] ABSTRACT

In a satellite communication system, ring-alerts are broadcast in a sequence that maximizes the time between when ring-alerts are issued in any adjacent antenna beam. Satellite power is conserved by allowing time for a subscriber unit to respond, after which subsequent ring-alerts directed at that subscriber are canceled. When a gateway receives a request for a ring-alert, the satellite and the antenna beams are identified which are currently serving the location of the subscriber unit being called. The satellite is provided a list of antenna beams and proceeds to broadcast ring-alerts directed at subscriber units within the identified antenna beams. Unsent ring-alerts are canceled when responses from the subscriber units are received.

21 Claims, 5 Drawing Sheets

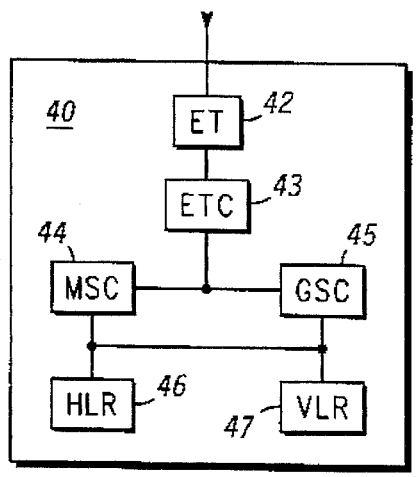
FIG. 4
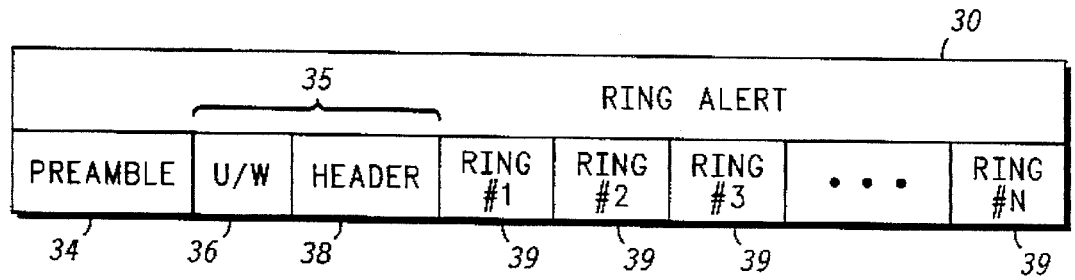
FIG. 5
FIG. 6

| TMSI # | EXPIRATION TIME | BEAMS |
|---|---|---|
| 1 | | 7,11,24,30 |
| 2 | | |
| 3 | | |
| ⋮ | | |
| N | | |

TMSI TABLE 70, 74, 72, 76

APPARATUS FOR REDUCING RING-ALERT POWER AND METHOD THEREFOR

TECHNICAL FIELD OF THE INVENTION

The present invention relates generally to cellular communication systems that broadcast within multiple antenna beams and communicate with users located within individual beams. More specifically, the present invention relates to satellite communication systems that transmit paging messages and ring-alerts within multiple antenna beams.

BACKGROUND OF THE INVENTION

Cellular communication systems ring called parties by sending ring-alert messages on a cell's broadcast channels. Ring-alert messages are directed to particular subscriber units. The subscriber units monitor the broadcast channels to determine when a ring-alert message is directed to a particular subscriber unit.

In cellular systems, ring-alerts are generally broadcasted in all cells of an entire geographic region where the called-party may reside. Broadcasting each ring-alert within a particular cell requires a certain amount of additional energy. In terrestrial cellular systems, there is no need to conserve energy because the energy supply is virtually unlimited. However, in a satellite communication system, where subscriber units receive ring-alerts from satellite communication nodes, it is desirable to conserve energy by broadcasting ring-alerts in as few antenna beams as possible, since a satellite's energy supply is extremely limited. For example, a satellite's power is generally limited to that supplied by its solar panels, and its batteries. Energy expended for ring-alerts reduces the amount of energy available for other communications.

Thus, what is needed are a method and apparatus to conserve energy onboard a satellite communication station that issues ring-alerts and pages. Moreover, what is needed are a method and apparatus for reducing the amount of power expended in transmitting ring-alerts in satellite-based communication systems. What is also needed are a method and apparatus for broadcasting ring-alerts and pages in as few antenna beams as possible in satellite communication systems.

BRIEF DESCRIPTION OF THE DRAWINGS

FIG. 4 illustrates a functional block diagram of a gateway suitable for use in a preferred embodiment of the present invention;

FIG. 5 shows a diagram of a ring-alert message suitable for use in a preferred embodiment of the invention;

FIG. 6 illustrates a beam transmission table suitable for use in a preferred embodiment of the present invention;

DESCRIPTION OF THE DRAWINGS

The present invention provides a method and an apparatus for reducing the power expended for ring-alerts by satellite communication stations. The present invention also provides a method and an apparatus for maximizing the delay between ring-alerts issued in adjacent antenna beams. The present invention also provides a priority scheme for issuing a first ring-alert and canceling unissued ring-alerts in other antenna beams once a subscriber unit responds. In addition to ring-alerts which are generally broadcasted to two-way communication devices, the present invention also applies to paging messages broadcasted to one-way communication devices.

A "satellite" is defined herein to mean a man-made object or vehicle intended to orbit earth and includes both geostationary and orbiting satellites and/or combinations thereof including low-earth orbiting (LEO) satellites. A "constellation" is defined herein to mean an ensemble of satellites arranged in orbits for providing specified coverage (e.g., radio communication, photogrammetry, etc.) of portion(s) or all of the earth. A constellation typically includes multiple rings (or planes) of satellites and may have equal numbers of satellites in each plane, although this is not essential. As used herein the terms "cell" and "antenna beam" are not intended to be limited to any particular mode of generation and include those created by either terrestrial or satellite cellular communications systems and/or combinations thereof. The present invention is applicable to systems including satellites having low-earth, medium-earth and geosynchronous orbits. Additionally, it is applicable to orbits having any angle of inclination (e.g., polar, equatorial or other orbital pattern).

Figure 1:
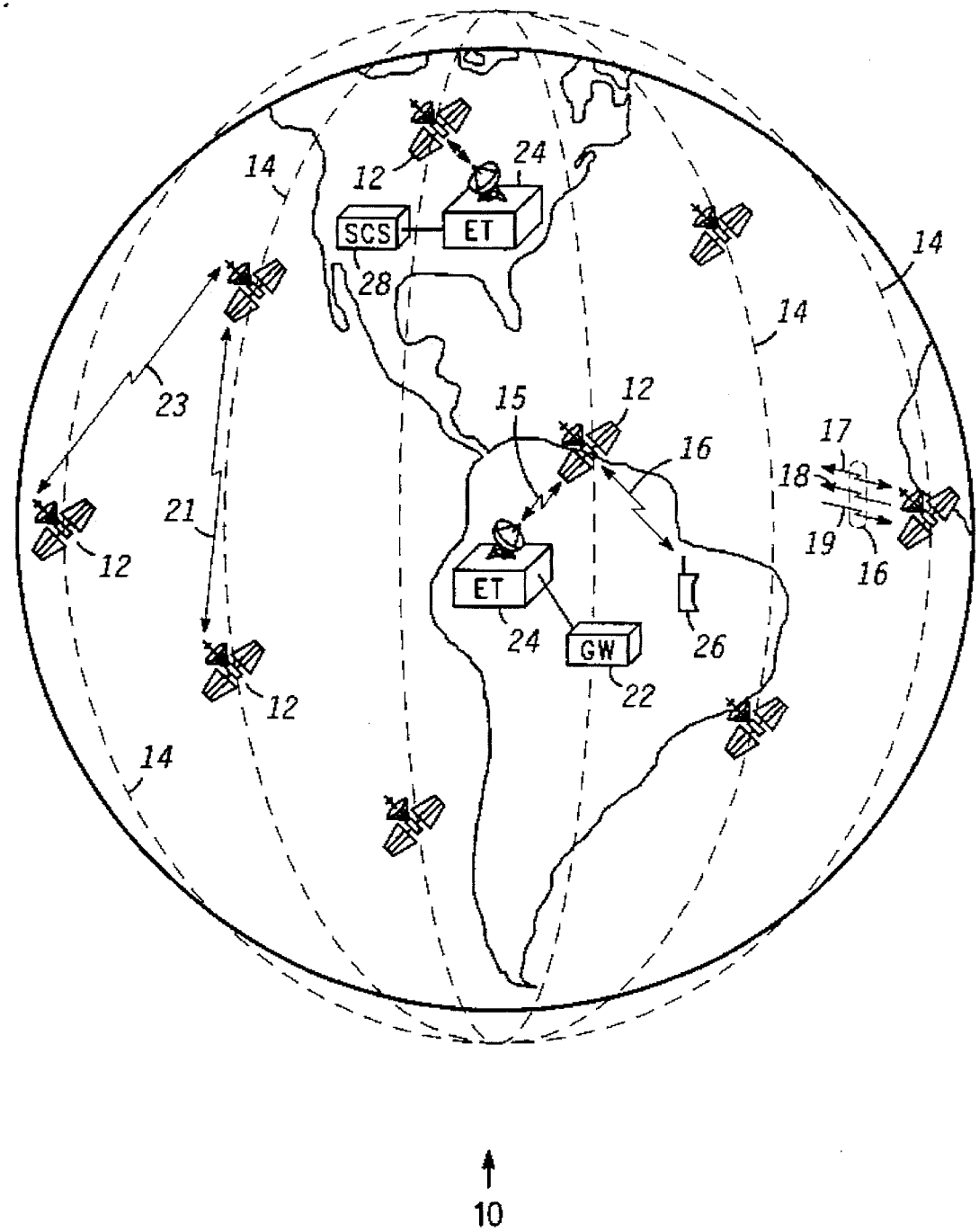
FIG. 1 illustrates a highly simplified diagram of a satellite-based communication system with which the present invention may be practiced.

FIG. 1 illustrates a highly simplified diagram of satellite-based communication system 10 with which the present invention may be practiced. Communication system 10 uses six polar orbits 14, with each orbit 14 holding eleven satellite communication stations 12 for a total of sixty-six satellites 12. However, this is not essential and more or fewer satellites, or more or fewer orbits, may be used. While the present invention is advantageously employed when a large number of satellites are being used, it is also applicable with as few as a single satellite. For clarity, FIG. 1 illustrates only a few satellite communication stations 12.

For example, each orbit 14 encircles earth at an altitude of around 780 km, although higher or lower orbital altitudes may be usefully employed. Due to the relatively low orbits of exemplary satellites 12, substantially line-of-sight electromagnetic (e.g., radio, light etc.) transmission from any one satellite or reception of signals by any one satellite involves or covers a relatively small area of earth at any instant.

For the example shown, satellites 12 travel with respect to earth at around 25,000 km/hr, allowing satellite 12 to be visible to a terrestrial station for a maximum period of approximately nine minutes. Satellite communication stations 12 communicate with terrestrial stations which may include some number of radio communication subscriber units 26 and earth terminals (ETs) 24 connected to system control segment (SCS) 28. ETs 24 may also be connected to gateways (GWs) 22, which provide access to the public switched telephone network (PSTN) or other communications facilities. Only one each of GWs 22, SCS 28 and SUs 26 are shown in FIG. 1 for clarity and ease of understanding. ETs 24 may be co-located with or separate from SCS 28 or GW 22. ETs 24 associated with SCSs 28 receive data describing tracking of satellites 12 and relay packets of control information while ETs 24 associated with GWs 22 only relay data packets (e.g., relating to calls in progress).

SUs 26 may be located anywhere on the surface of the earth or in the atmosphere above the earth. SUs 26 are preferably communications devices capable of transmitting data to and receiving data from satellites 12. By way of example, SUs 26 may be a hand-held, portable cellular telephones adapted to communicate with satellites 12. Ordinarily, SUs 26 need not perform any control functions for communication system 10.

Communication system 10 may accommodate any number, potentially in the millions, of subscriber units 26. In the preferred embodiments of the present invention, subscriber units 26 communicate with nearby satellites 12 via subscriber links 16. Links 16 encompass a limited portion of the electromagnetic spectrum that is divided into numerous channels. Links 16 are preferably combinations of L-Band frequency channels and may encompass Frequency Division Multiplex Access (FDMA) and/or Time Division Multiple Access (TDMA) communications or combination thereof. As a minimum, a satellite 12 continuously transmits over one or more broadcast channels 18. Subscriber units 26 synchronize to broadcast channels 18 and monitor broadcast channels 18 to detect data messages which may be addressed to them. These data messages include both ring-alerts which notify a subscriber unit that another party desires communication, as well as pages which deliver specific messages. Subscriber units 26 may transmit messages to satellites 12 over one or more acquisition channels 19. Broadcast channels 18 and acquisition channels 19 are not dedicated to any one subscriber unit 26 but are shared by all subscriber units 26 currently within view of a satellite 12.

On the other hand, traffic channels 17 are two-way channels that are assigned to particular subscriber units 26 by satellites 12 from time to time. In the preferred embodiments of the present invention, a digital format is used to communicate data over channels 17–19, and traffic channels 17 support real-time communications. At least one traffic channel 17 is assigned for each call, and each traffic channel 17 has sufficient bandwidth to support, as a minimum, a two-way voice conversation. To support real-time communications, a TDMA scheme is desirably used to divide time into frames, preferably in the 60–90 millisecond range. Particular traffic channels 17 are assigned particular transmit and receive timeslots, preferably having durations in the 3–10 millisecond range, within each frame. Analog audio signals are digitized so that an entire frame's signal is transmitted or received in a single short high speed burst during an allotted time-slot. Preferably, each satellite 12 supports up to a thousand or more traffic channels 17 so that each satellite 12 can simultaneously service a like number of independent calls.

Satellites 12 communicate with other nearby satellites 12 through cross links 23. Thus, a communication from a subscriber unit 26 located at any point on or near the surface of the earth may be routed through the constellation of satellites 12 to within range of substantially any other point on the surface of the earth. A communication may be routed down to a subscriber unit 26 on or near the surface of the earth from a satellite 12 using a subscriber link 16. Alternatively, a communication may be routed down to or up from any of many ETs 24, of which FIG. 1 shows only two, through earth links 15. ETs 24 are preferably distributed over the surface of the earth in accordance with geo-political boundaries. In the preferred embodiments, each satellite 12 may communicate with up to four ETs 24 and over a thousand subscriber units 26 at any given instant.

SCS 28 monitors the health and status of system communication nodes (e.g., GWs 22, ETs 24 and satellites 12) and desirably manages operations of communication system 10. One or more ETs 24 provide the primary communications interface between SCS 28 and satellites 12. ETs 24 include antennas and RF transceivers and preferably perform telemetry, tracking and control functions for the constellation of satellites 12.

GWs 22 may perform call processing functions in conjunction with satellites 12 or GWs 22 may exclusively handle call processing and allocation of call handling capacity within communication system 10. Diverse terrestrial-based communications systems, such as the PSTN, may access communication system 10 through GWs 22.

With the example constellation of sixty-six satellites 12, at least one of satellites 12 is within view of each point on earth's surface at all times (i.e., full coverage of the earth's surface is obtained). Theoretically, any satellite 12 may be in direct or indirect data communication with any SU 26 or ET 24 at any time by routing data through the constellation of satellites 12. Accordingly, communication system 10 may establish a communication path for relaying data through the constellation of satellites 12 between any two SUs 26, between SCS 28 and GW 22, between any two GWs 22 or between SU 26 and GW 22.

Figure 2:
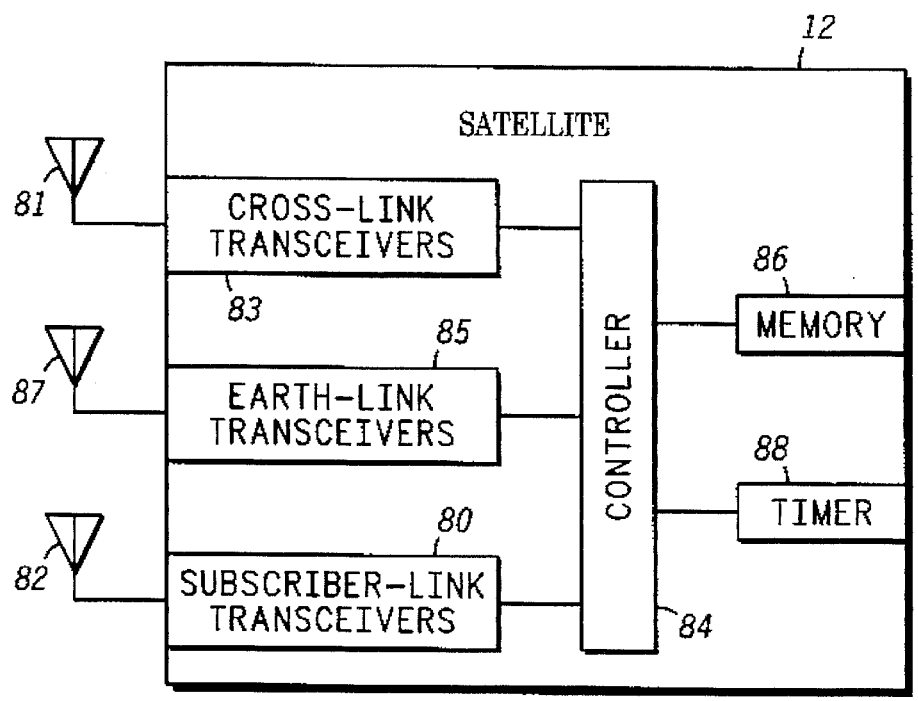
FIG. 2 illustrates a simplified block diagram of a satellite communication station suitable for use in a preferred embodiment of the present invention.

FIG. 2 illustrates a simplified block diagram of satellite communication station 12 suitable for use in a preferred embodiment of the present invention. Preferably, all satellites 12 within system 10 (see FIG. 1) include equipment as illustrated by the block diagram of FIG. 2. Satellite 12 includes cross-link transceivers 83 and associated antennas 81. Transceivers 83 and antennas 81 support cross-links to other nearby satellites 12. Earth-link transceivers 85 and associated antennas 87 support earth-links to communicate with earth terminals 24 (FIG. 1). Subscriber-link transceivers 80 and associated antennas 82 support subscriber units 26 (FIG. 1). Preferably, each satellite 12 may simultaneously support a link for up to several thousand or more of subscriber units 26 (FIG. 1). Of course, those skilled in the art will appreciate that antennas 81, 87, and 82 may be implemented either as single multidirectional antennas or as banks of discrete antennas. It is desirable that each subscriber-link antenna 82 be a phased array antenna capable of accessing many antenna beams simultaneously.

A controller 84 couples each of transceivers 83, 85, and 80 as well as to a memory 86 and a timer 88. Controller 84 may be implemented using one or more processors. Controller 84 uses timer 88 to maintain, among other things, the current date and time. Memory 86 stores data that serve as instructions to controller 84 and that, when executed by controller 84, cause satellite 12 to carry out procedures which are discussed below. In addition, memory 86 includes variables, tables, and databases that are manipulated during the operation of satellite 12.

Subscriber-link transceivers 80 are desirably multi-channel FDMA/TDMA transceivers capable of transmitting and receiving on all different selectable frequencies during particular, selectable, time slots as directed by controller 84. Subscriber-link transceivers 80 contain multi-channel radios having a sufficient number of channels to provide the desired number of transmission and reception frequencies for signal access and control and for the user voice and/or data. Controller 84 may provide for allocation of the frequency and time-slot assignments, antenna beam-to-antenna beam hand-off and other overhead and management and control functions. Subscriber-link transceivers 80 desirably provide for transmission and reception on any frequency channel set so that each subscriber-link transceivers 80 may, if needed, utilize the entire spectral capacity of all frequency channel sets by having the capability to handle all frequency and time slot assignments.

Figure 3:
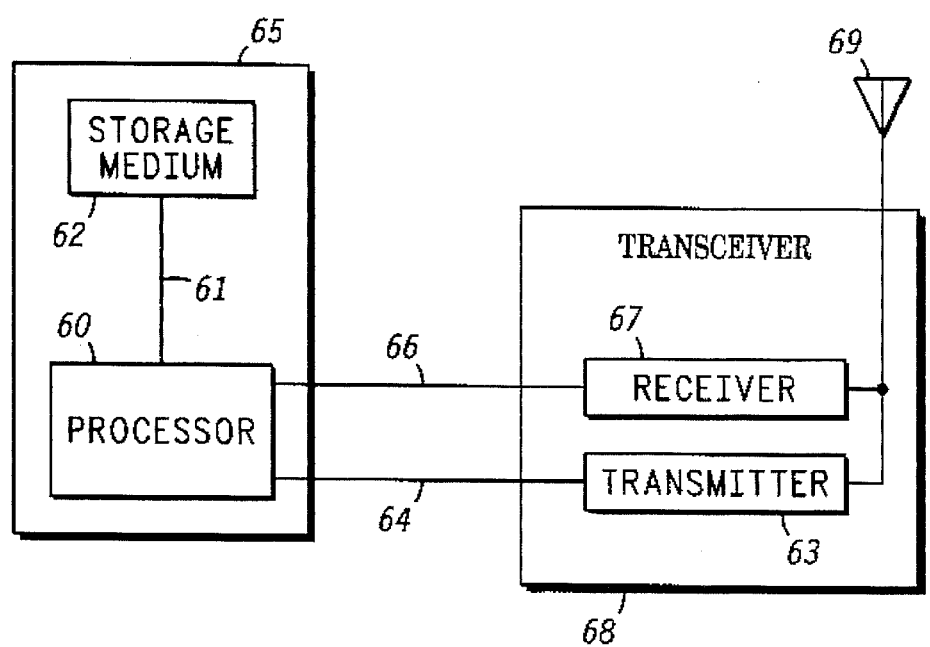
FIG. 3 illustrates a simplified block diagram of a system control station and a terrestrial station suitable for use in a preferred embodiment of the present invention.

FIG. 3 illustrates a simplified block diagram of system control station 65 and terrestrial station 68 suitable for use in a preferred embodiment of the present invention. Control station 65 and terrestrial station 68 are desirable part of SCS 28 (FIG. 1) and ET 24 (FIG. 1) respectively. Control station 65 comprises processor 60 coupled to associated storage medium 62 (e.g., random access memory or RAM, other semiconductor or magnetic read-write memory devices, optical disk, magnetic tape, floppy disk, hard disk etc.) via link 61. Terrestrial station 68 includes antenna 69 coupled to transmitter 63 and receiver 67. Transmitter 63 and receiver 67 are coupled to processor 60 via links 64 and 66, respectively. Processor 60 desirably carries out procedures exemplified below and described in the associated text. For example, in addition to performing other tasks as appropriate, processor 60 desirably stores results from such procedures in storage medium 62. Transmitter 63 and/or receiver 67 transmit messages to and/or receive messages from satellites 12.

Processor 60 generally controls and manages user access, message reception and transmission, channel setup, radio tuning, frequency and time slot assignment, and other cellular radio communication and control functions not managed or provided for by controller 84 (FIG. 2). Among other things, processor 60 and/or controller 84 (FIG. 2) desirably executes procedures to allow user access to communication system 10. This may include procedures for protocols for channel setup and other associated functions as discussed below.

FIG. 4 illustrates a functional block diagram of a gateway suitable for use in a preferred embodiment of the present invention. Gateway 40 is analogous to gateway 22 of FIG. 1. Gateway 40 may desirably include earth terminal 42 which is analogous to ET 24 (FIG. 1). Gateway 40 may also include earth terminal controller (ETC) 43 analogous to terrestrial station 68 (FIG. 3) which interfaces mobile switching center (MSC) 44 to the constellation. ETC 43 provides functions not supported by MSC 44 including a logical interface between subscriber units and MSC 44. ETC 43 processes signaling data and routes traffic data exchanged between subscriber units and MSC 44. The principle functions of ETC 43 include managing the radio channels and transferring signaling information to and from subscriber units. When the type of call handling or signaling does not directly affect ETC 43, ETC 43 desirably serves as a relay between a subscriber unit and MSC 44.

MSC 44 is preferably similar to a telephone switching office for mobile originated and mobile terminated calls. MSC 44 provides an interface to a PSTN, and to the terrestrial circuits of ETC 43. MSC 44 communicates and passes signaling and traffic data to ETC 43 which provides the opportunity for remote switching, distributed control, and traffic concentration. MSC 44 also provides call control functions, such as number translation and routing, matrix path control, and allocation of outgoing trunks, for example. MSC 44 desirably collects call billing data, formats the data into records, and sends these records to a billing center. MSC 44 may also collect traffic statistics for performance and management purposes.

Home location register (HLR) 46 is a data base which manages subscriber data and keeps track of a subscriber unit's location as the subscriber unit roams around the earth. HLR 46 is a reference data base for subscriber parameters. Various identification numbers and addresses are stored within HLR 46, as well as authentication parameters, services subscribed to, and special routing information. Current subscriber status is also preferably maintained, including a subscriber's temporary roaming number and associated visitor location register (VLR) 47 when roaming. This data may be remotely accessed by the MSCs and VLRs. HLR 46 desirably includes an authentication center which is responsible for protecting against fraudulent system use.

VLR 47 is a data base which preferably contains a copy of most of the data stored at HLR 46. This data is a temporary entry which exists only as long as a particular subscriber is known to be operating within the area served by VLR 47. VLR 47 provides a local data base for a subscriber which eliminates unnecessary interrogations of HLR 46. VLR 47 may contain some duplicate HLR data as well as more precise location information and status. VLR 47 manages subscriber unit data and keeps track of subscriber unit's locations.

Gateway switching center (GSC) 45 provides switching functions for gateway 40. GSC 45 may use Group Special Mobile (GSM) system elements which desirably include the following network elements: MSC 44, HLR 46, VLR 47, and an equipment identity register (not shown).

In a preferred embodiment of the present invention, a subscriber unit accesses another subscriber unit by calling the called user's mobile subscriber directory number or mobile subscriber integrated services directory number which uniquely identifies one, and only one subscriber unit. A gateway identifies a location of the called subscriber unit by querying the called party's HLR. The gateway identifies a temporary mobile subscriber identification (TMSI) associated with the called subscriber unit. The HLR in conjunction with an associated VLR provide a location code associated the called party. The location code is used by the gateway to identify the particular satellite and antenna beams that may be currently servicing the particular location where the called subscriber unit is believed to be located. The gateway sends notification to the satellite which broadcasts a ring-alert message within the specified antenna beams. The gateway's notification to the satellite preferably includes the called subscriber unit's TMSI.

FIG. 5 shows a diagram of ring-alert message 30 suitable for use in a preferred embodiment of the invention. Communication system 10 (FIG. 1) uses broadcast channel 18 (FIG. 1) to inform subscriber units 26 of incoming calls. In a preferred embodiment, ring-alert message 30 comprises a preamble 34, control information 35, and a list of subscriber unit IDs 39. Preamble 34 facilitates the acquisition of ring-alert message 30, and in a preferred embodiment, is a fixed period of an unmodulated carrier frequency.

In a preferred embodiment, control information 35 comprises a unique word 36 and a header 38. Unique word 36 uniquely identifies a communications command between subscriber units 26 and satellites 12. Header 38 comprises satellite ID, antenna beam ID, antenna beam geographic location, next ring-alert interval, and beam specific broadcast channel frequency and time slot information. Subscriber units 26 may use antenna beam geographic location information rather from received power measurements for calculating a servicing antenna beam.

Subscriber unit IDs 39 indicate a request for communication with a subscriber unit located within a specific antenna beam. When a subscriber unit detects a subscriber unit ID 39 matching its own, subscriber unit 26 notifies the satellites of its availability to receive the call.

Satellite communication stations 12 (FIG. 1) individually transmit ring-alert messages 30 to antenna beams in sequential subscriber-link frames. Since satellites 12 will only "ring" (send a subscriber unit ID) a subscriber unit in a specific antenna beam, subscriber units 26 need only monitor ring-alert channel when satellites 12 transmit a ring-alert message 30 into the antenna beam within which subscriber unit 26 is located.

In the preferred embodiment, satellite 12 sends ring-alerts to each of its antenna beams serially, rather than sending ring-alerts to all beams at the same time. This way each antenna beam may have a unique set of ring-alerts directed to specific subscriber units located within each beam.

FIG. 6 illustrates beam transmission table 50 suitable for use in a preferred embodiment of the present invention. Table 50 is maintained by satellite communication station 12 and may be generated either by gateway 22 or within the satellite. Table 50 identifies each antenna beam 52 that is broadcasted by the satellite, and associates each antenna beam with TMSIs 54 of subscriber units for which ring-alerts are broadcasted. TMSIs 54 are analogous to subscriber unit ID 39 (FIG. 5). Each TMSI 54 has an associated expiration time which is discussed below. The example of table 50 shows that there are 49 antenna beams over which the satellite has jurisdiction, but more or less antenna beams may be used.

Referring to table 50, when a ring-alert is broadcasted in beam #1, all the TMSIs 54 listed for beam #1 are broadcasted. Likewise, when a ring-alert is broadcasted in beam #2, all the TMSIs 54 listed for beam #2 are broadcasted. In the preferred embodiment, each beam's ring-alert message is broadcast at a different time than other beam's ring-alert messages.

Figures 7, 8:
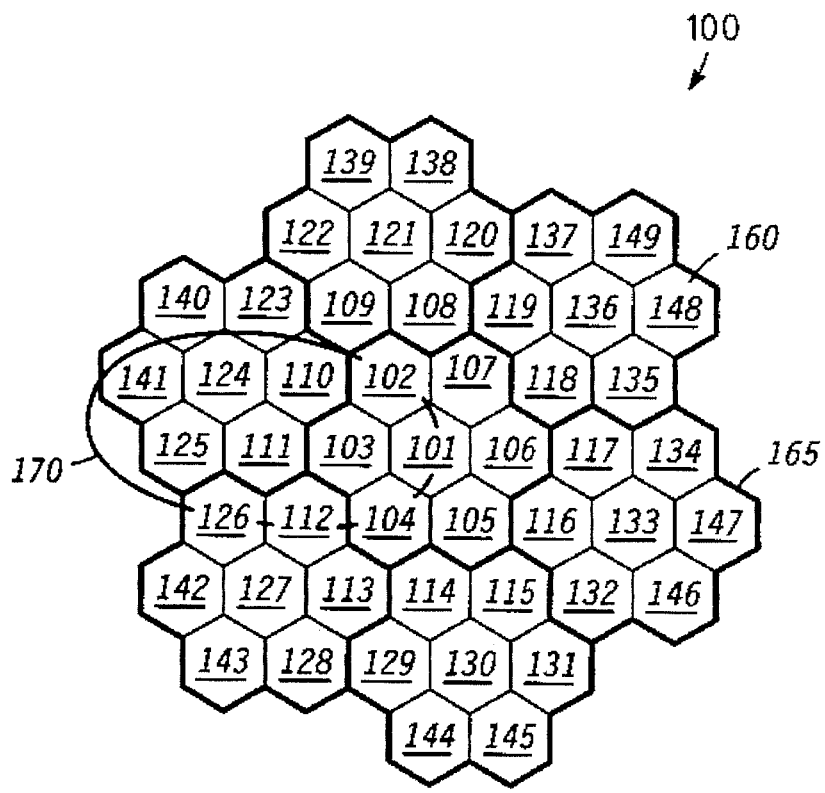
FIG. 7 illustrates a Temporary Mobile Subscriber Identifier (TMSI) table suitable for use in a preferred embodiment of the present invention.
FIG. 8 illustrates a footprint of antenna beams broadcasted by a satellite communication station suitable for use in a preferred embodiment of the present invention.

FIG. 7 illustrates Temporary Mobile Subscriber Identifier (TMSI) table 70 suitable for use in a preferred embodiment of the present invention. Table 70 identifies the TMSI of all called subscriber units for which ring-alerts are being broadcasted by a particular satellite. Table 70 identifies all antenna beams 76 for which that particular TMSI is broadcasted, and also identifies an expiration time 74, after which the ring-alert for that particular TMSI is canceled. Table 70 does not need to be separately maintained than table 50 (FIG. 6), but may be combined or indexed as one table. Table 70 is shown separately here for illustrative purposes.

In a preferred embodiment, the list of beams 76 associated with particular TMSIs indicates one particular antenna beam which the subscriber-unit is most likely located. This is discussed in more detail below. A ring-alert for a subscriber unit is preferably broadcast within this one beam before the other beams listed in table 70. Ring-alerts for TMSIs are canceled either when the expiration time has passed, or when a response is received from the called subscriber unit 26 (FIG. 1). The entry in table 70 is then eliminated.

FIG. 8 illustrates footprint 100 of antenna beams broadcasted by a satellite communication station suitable for use in a preferred embodiment of the present invention. Footprint 100 includes a plurality of antenna beams 160 which are labeled sequentially 101 through 149. Antenna beams 160 are shown as hexagonal in shape for illustrative purposes only. Those of skill in the art will understand that because beams 160 represent antenna patterns broadcasted from a satellite onto the surface of the earth, the beams may be more circular or elliptical in shape. As discussed in reference to the preferred embodiment of FIG. 1, footprint 100 is moving across the surface of the earth as the satellite transmitting the footprint moves through its orbit 14 (FIG. 1). As a result, a subscriber unit located on the surface of the earth may only be located within any particular beam for a short amount of time.

Antenna beams 160 may be viewed in seven-antenna beam groupings 165 which are defined by mutually orthogonal reuse units (i.e., non-interfering FDMA and TDMA channels). This is discussed in more detail below.

Satellites issue ring-alerts to antenna beams 160 by sending ring-alert messages 30 (FIG. 5) discussed above to each individual antenna beam. Terrestrial cellular communication systems generally issue ring-alerts for a specific subscriber unit in all cells associated with a particular transmitter. In terrestrial cellular systems, sometimes a large area of cells is rung. If there is no response and there is a neighboring cellular coverage area adjacent to this area, sometimes a ring will be issued in that adjacent area of cells in the chance that the subscriber has wandered over the system boundaries into the adjacent area.

For example, if footprint 100 represents cells formed by a terrestrial ground station, it may issue ring-alerts in all antenna beams (i.e., 101 through 149) at the same time. Also, ring alerts in communication systems may be issued sequentially in adjacent cells, for example beginning in antenna beam 101 and sequentially proceeding through antenna beam 149. These methods of transmitting ring-alerts are inefficient for satellite-based communication systems because excess energy is used broadcasting ring-alerts to antenna beams where a subscriber unit may not be located. Further, ring-alert transmission in sequential adjacent antenna beams may result in the transmission of ring-alerts after the subscriber unit has responded. This is explained in more detail below.

In a preferred embodiment of the present invention, ring-alert messages 30 (FIG. 5) are sent approximately every ninety milliseconds (msec) to each one of antenna beams 160. When a subscriber unit receives a ring-alert directed toward itself, the subscriber unit requires approximately four-hundred to five-hundred milliseconds to respond to the satellite. In the example of 49 individual antenna beams, it would take approximately 4.41 seconds to ring all forty-nine antenna beams sequentially when sequential ring-alerts are ninety milliseconds apart (i.e., using 90 msec time frames).

When a satellite is requested to issue a ring-alert for a particular subscriber unit, a gateway provides the satellite with the subscriber unit's approximate location. For example, the gateway may determine that the subscriber unit is probably located within region 170 (FIG. 8). The gateway sends a list of beams which include all beams covering region 170. In the example shown in FIG. 8, the list of beams would include beams 101–104, 110–112, 124–126 and 141. As a result, satellite 12 broadcasts a ring-alert in all of these antenna beams until either a response is received by the subscriber unit, or a predetermined time has expired. In a preferred embodiment, a subscriber may take anywhere between 400 and 700 milliseconds to respond to a ring alert, with typical values being in the range of 550 to 650 milliseconds.

If the satellite broadcasts ring-alerts in an order, such as sequentially, for example starting with antenna beam 101, then antenna beam 102 up to antenna beam 149, a response received from a subscriber unit located in antenna beam 101 would not be received for an additional 400–700 milliseconds (msec) due to the response time of a subscriber unit. During this time, ring-alerts for that particular subscriber unit would be broadcasted in adjacent antenna beams 102, 103 and 104, because ring-alerts are broadcasted approximately every 90 msec. After the response to the ring-alert is received at the satellite, the ring-alerts directed at that subscriber unit in antenna beams 110–112, 124–126 and 140–141 is canceled. Note however, that energy is wasted transmitting the ring-alert in antenna beams 102–104 because of the delay associated with the response time of a subscriber unit.

The present invention, among other things, eliminates the power wasted in the broadcasting of ring-alerts after a subscriber unit receives the ring-alert, by maximizing the delay between ring-alerts broadcasted in adjacent antenna beams. For example, ring-alerts may be issued in the following order: antenna beam 101, 121, 124, 127 130, 133 and 136, selecting the center antenna beam of each reuse group 165. Next, antenna beams 102, 139, 140, 126, 114, 117 and 137 are sequentially issued ring-alerts. Note that these antenna beams are the upper right antenna beam of each reuse group. The process is repeated until a ring-alert is broadcasted in all antenna beams. This is only one example of maximizing the delay between ring-alerts issued in adjacent antenna beams. Those of skill in the art will be able to understand that other sequences can maximize the time between ring-alerts issued in adjacent antenna beams depending on the specific configuration.

In the above example where the subscriber unit to which a ring-alert is directed is located in region 170, if the subscriber unit is actually located in antenna beam 101, the subscriber unit will respond before a ring-alert is issued in antenna beams 102, 103 and 104. Thus, energy onboard the satellite is conserved.

In the preferred embodiment, a ring-alert sequence is chosen to get a maximum time spacing between when a ring-alert is issued in an antenna beam and when a ring-alert is issued in the antenna beam's neighbors. For example, in one embodiment, ring-alerts are issued in adjacent antenna beams at a maximum of every 540 msec (4.41 seconds per seven cell groups), while the subscriber unit response time is between 400–700 msec. This is discussed in more detail below.

An example of a method to maximize the time difference between ring alerts issued on neighboring beams is discussed below. Among the many methods of doing this, one of which borrows from frequency reuse concepts of cellular telephony. In this case, each beam has six neighbor beams, so for the purpose of reusing frequency reuse concepts, the beams are broken up into a seven beam (1 center plus six neighbor) reuse groups. For example, the antenna beams shown in FIG. 8 have this relationship.

A ring pattern is generated that exhibits the desired maximum delay spacing by sequentially picking a beam from each group of seven using the same relative position within the group of seven. For example, a maximum delay spacing ring-sequence may be as follows:
First the center cells of each group:
 124, 121, 136, 133, 130, 127, 101
Next the upper right cell in each group:
 123, 138, 149, 134, 115, 112, 107
Next the upper left cell in each group:
 140, 139, 137, 117, 114, 126, 102
For the last four groups of cells we have:
 141, 122, 119, 116, 129 , 142, 103; 125, 109, 118, 132, 144, 143, 104; 111, 108, 135, 146, 145, 128, 105; 110, 120, 148, 147, 131, 113, 106.

Ideally, 49 beams broken into 7 groups provides 7 time units between each beam transmission. The above sequence provides a minimum of 5 time units between all adjacent beams. In the preferred embodiment with 90 msec between sequential ring-alerts issued, there is 5*90 msec or 450 msec between ring-alerts issued in adjacent beams. Most of the adjacent beams will see 7 time units of time differential between ring-alerts issued in neighboring beams which is 7*90 msec or 630 msec.

In order to demonstrate this sequence has the desired properties, an antenna beam is chosen and the timing of its neighbors is checked. For example, antenna beam 115 has 105, 116, 132, 131, 130, and 114 as neighbors. From the above list, these beams will be rung in the following order:

| Beam | Ring Order | Time to Next Ring |
| --- | --- | --- |
| 130 | 5 | 7*90 = 630 msec |
| 115 | 12 | 7*90 = 630 msec |
| 114 | 19 | 6*90 = 540 msec |
| 116 | 25 | 7*90 = 630 msec |
| 132 | 32 | 10*90 = 900 msec |
| 105 | 41 | 5*90 = 450 msec |
| 131 | 47 | 7*90 = 630 msec |

It can be seen that most beams have seven time units between the beams. One of the seven gets only five time units (antenna beam 105), while one gets ten time units (antenna beam 132).

In the above example using footprint 100 of FIG. 8, each antenna beam 160 is shown with six neighbors for illustrative purposes only. Those of ordinary skill in the art will understand that this invention is not limited to one specific configuration, but that it applicable to configurations where antenna beams have more or less than six adjacent antenna beams. Furthermore, the time delay of 90 msec between ring-alerts issued in sequential antenna beams is used only as an example. The invention is equally applicable to time delays of more or less than 90 msec.

Figure 9:
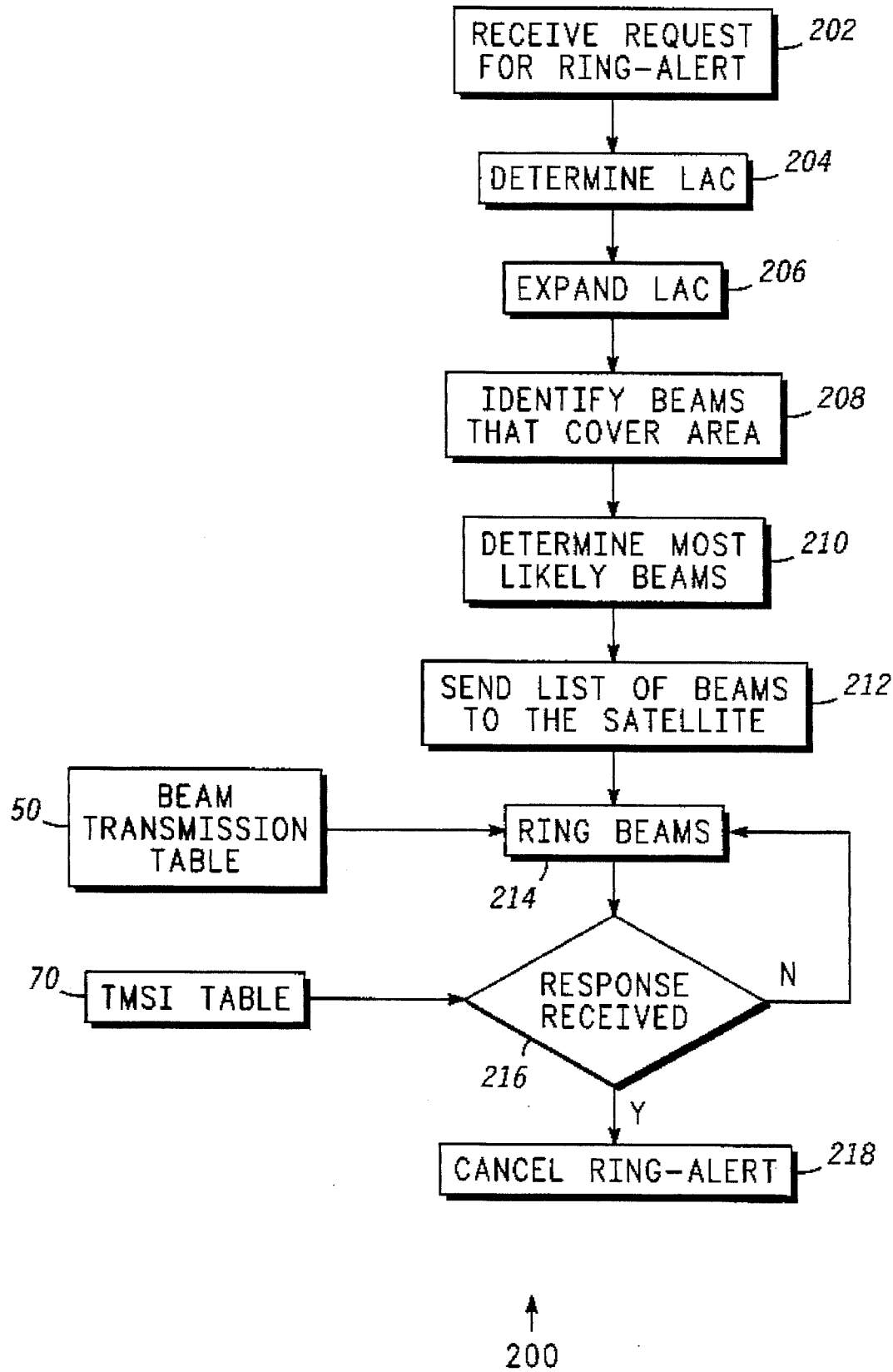
FIG. 9 shows a flow chart of a ring-alert procedure suitable for use in a preferred embodiment of the present invention.

FIG. 9 shows a flow chart of ring-alert procedure 200 suitable for use in a preferred embodiment of the present invention. Tasks 202–212 of procedure 200 are preferably performed by gateway 22 (FIG. 1), and tasks 214–218 are preferably performed by satellite communication station 12 (FIG. 1).

In task 202, a gateway ETC receives a request for a ring-alert. Such a request is preferably initiated by a user requesting communication system 10 (FIG. 1) to ring a particular subscriber unit. An example of this is where a caller attempts to place a telephone call to a party operating within communication system 10. In a preferred embodiment, gateway switching center 45 (FIG. 4) receives an indication that someone in the telephony network is trying to call a network subscriber.

In task 204, the ETC determines a local area code (LAC) associated with the called subscriber unit. The LAC is preferably based on the called party's previous LAC. In the preferred embodiment, the HLR and VLR discussed above, keep track of the called party's location. The gateway switching center checks Location Registers (HLR 46 and VLR 47 (FIG. 4)) in order to find out where the subscriber is located (his LAC) and what his temporary ID (TMSI) is.

In task 206, the LAC is expanded by a distance to compensate for a subscriber unit's movement. This includes a re-registration distance and an error tolerance. For example, a subscriber unit may change it's geographic location up to approximately 200 miles before it is required to re-register. A re-registration distance of approximately 200 miles is added to the LAC.

In a preferred embodiment, in task 206, Gateway switching center 45 (FIG. 4) sends the ring alert order to gateway ETC 43 (FIG. 4). The ring alert order contains the subscriber ID and location information (e.g., TMSI and LAC). The area the subscriber was last reported in (e.g., LAC) is expanded by the amount the subscriber could have moved since it last registered with the system. In this embodiment, a subscriber unit is preferably designed such that when its movement exceeds a system defined distance from its last registration point (re registration distance), it will re-register. Therefore the last known LAC area should be expanded in all directions by this re registration distance in order to determine the region to cover with the ring alerts.

In task 208, the ETC identifies a satellite that is presently providing coverage for all or part of the expanded LAC. The ETC also preferably identifies which antenna beams of the satellite cover the expanded LAC. This can be done by correlating the geographic location of the subscriber unit to a set of antenna beams. The ETC may also identify several satellites that cover the expanded LAC in the case where one satellite does not cover the entire expanded LAC.

In task 208, gateway ETC 43 (FIG. 4) uses its knowledge of the satellite's orbital position and antenna beam ground projections to see which beams from which satellites touch the above region the subscriber unit 26 (FIG. 1) is in. Since it may be unknown exactly which antenna beam's broadcast channel the subscriber unit is currently listening to, it may be insufficient to determine which minimum subset of antenna beams provide coverage over this area. Instead, all beams that touch the designated area are preferably targeted for a ring-alert.

In task 210, the ETC determines the particular antenna beam where the subscriber unit being called is most likely located. Preferably, this is done using prior registration information on the subscriber unit. Out of the list of antenna beams and satellites identified in task 208, for each satellite, a single beam is chosen as most likely to be received by the subscriber unit. This may be the antenna beam that provides the highest degree of coverage over the area that the subscriber unit 26 (FIG. 1) is presumed to be located in for that satellite.

In task 212, the ETC sends a list of antenna beams to ring for the called subscriber unit to the satellite. In the preferred embodiment, the ETC includes the subscriber unit's TMSI. In a preferred embodiment, the gateway generates a set of antenna beam lists based upon the number of satellites providing coverage in the desired region. The ETC then sends each satellite a ring alert message comprising of the subscriber unit's TMSI, a list of beams from which to send the ring alert, and the most likely beam.

In task 214, the satellite adds the ring-alert request for the called subscriber unit to its ring-alert transmission tables. In the preferred embodiment, the ring-alert is first broadcasted in the beam where the called subscriber unit is most likely residing. The satellite continues it's sequence of transmitting ring-alerts to each antenna beam. The ring-alert sequence is determined in such a way to provide a maximum delay between a ring-alert issued in adjacent antenna beams. The satellite preferably uses a beam transmission table, such as table 50 (FIG. 6) stored in its memory when broadcasting the ring-alerts.

The TMSI and beam list information from the ring-alert message is placed into tables and queues at the satellite. There is preferably a TMSI table similar to table 70 (FIG. 7) associated with each beam. When it is time for a beam to send its ring-alert information, subscriber units listen to hear if their TMSI is sent. If so, the subscriber unit has an incoming call and needs to respond through the satellite to answer that call. The TMSI table is used to hold all the outstanding TMSIs to be rung for that beam. When a TMSI is sent over the ring alert broadcast channel (e.g., broadcast channel 18 (FIG. 1), that TMSI is eliminated from the table entry for that beam. In the preferred embodiment, a satellite sends ring alert information for one beam approximately every 90 msec.

The order that the beams are rung has been set such as to provide maximum delay from when one beam and any of its neighbor beams are rung. In the preferred embodiment, each beam has six neighbors, providing for a delay of at least 540 msec from the time that a ring is issued from one beam and a ring being issued from a neighboring beam. The beam ring order producing maximum delay between neighboring beams allows time for the subscriber unit 26 (FIG. 1) to respond to a ring alert and allows for the outstanding unissued ring alerts in the remaining beams to be canceled before the next one could be issued, thus saving satellite power.

In order to cancel the remaining outstanding ring alerts, a database similar to table 70 (FIG. 7) ties the TMSI of the responding subscriber unit 25 (FIG. 1) to a list of beams that could still have outstanding ring alerts. Each entry in this table has a time-out or expiration time associated with it so that in the event that the subscriber unit does not respond to the ring alert and all the outstanding ring alerts get sent, the satellite will know when the TMSI entry in the Beam Transmission Table can be removed as no longer relevant. The expiration of a TMSI entry in the Beam Transmission Table does nothing to the TMSIs in the TMSI table. By this point they have long been sent.

Task 216 determines if the satellite has received a response for the subscriber unit. If a response is received, any subsequent ring-alerts directed at that subscriber unit are canceled in task 218. If no response has been received, the ring-alert remains in the table and the satellite continues to broadcast ring-alerts for all antenna beams, including ring-alerts directed at the called subscriber unit in identified antenna beams. When a response has been received by the subscriber unit to which a ring-alert is directed, task 218 cancels the remaining (i.e., unsent) ring-alerts directed to that subscriber unit. Task 218 preferably uses a TMSI table, similar to Table 70 (FIG. 7) when canceling ring-alerts associated with a particular subscriber unit.

In the preferred embodiment, when a TMSI ring alert is sent, that TMSI is removed from the ring list for that beam in TMSI Table 70. What is left in the table are the TMSI entries associated with beams that have not yet been rung. If no response is received from the subscriber unit, all of the beams will get a change to send, leaving no TMSI entries for that subscriber unit 26 (FIG. 1) in TMSI Table 70.

While the invention has been described in terms of specific examples and with specific preferred embodiment, it is evident that many alternatives and variations will be apparent to those skilled in the art based on the description herein, and is intended to include such variations and alternatives in the claims.

As described herein, the advantages of the present invention will be apparent to those of skill in the art and provide improved methods of operating various parts of a communication system. These advantages include reduced power consumption in an environment where the energy available is extremely limited. The advantages also include reduced power consumption through reordering a beam ring-alert sequence and by the cancellation of unsent ring-alerts. Other advantages include a maximization of the time a satellite is allocated to cancel unsent ring-alerts and a prioritization of ring-alerts to conserve the number of ring-alerts actually transmitted.

What is claimed is:

1. A method of reducing ring-alert power in a node of a communication system, said communication system including a gateway that communicates with said node, said node having a plurality of antenna beams, said method comprising the steps of:
   (a) identifying a set of antenna beams from said plurality of antenna beams where a subscriber unit is likely to be located, said set of antenna beams having adjacent antenna beams, the identifying step being performed by said gateway;
   (b) said node sequentially transmitting a ring-alert message within said antenna beams of said set using a sequence that maximizes time intervals between said ring-alert message transmitted in said adjacent antenna beams of said set, said ring-alert message being addressed to said subscriber unit; and
   (c) said node discontinuing the performance of step (b) when a response is received from said subscriber unit.

2. A method as claimed in claim 1 wherein the sequentially transmitting step further comprises the step of. transmitting in other beams of said set before transmitting in said adjacent beams of said set.

3. A method as claimed in claim 1 further comprising the step of said gateway determining a geographic location where said subscriber unit resides, wherein said step of determining includes the step of authenticating said geographic location for said subscriber unit.

4. A method as claimed in claim 3 wherein the determining step further comprises the step of determining a local area code which identifies said geographic location.

5. A method as claimed in claim 3 wherein the determining step further comprises the step of determining said geographic location based on a registration of said subscriber unit within said geographic location, and
   wherein the identifying step comprises the step of identifying said set of antenna beams where said subscriber unit is likely to be located by correlating said geographic location of said subscriber unit to said plurality of antenna beams.

6. A method as claimed in claim 1 further comprising the step of the gateway determining a ring-alert sequence based on a present configuration of said plurality of antenna beams.

7. A method as claimed in claim 3 wherein the determining step further comprises the step of determining said geographic location by querying a visiting location register (VLR) associated with said gateway, said VLR containing a database including said geographic location of said subscriber unit.

8. A method as claimed in claim 1 further comprising the step of identifying one of said set of antenna beams where said subscriber unit is most likely located.

9. A method as claimed in claim 8 wherein the transmitting step additionally comprises the step of transmitting said ring-alert message within said one of said antenna beams of said set of antenna beams before transmitting said ring-alert message within other antenna beams of said set, wherein a time delay occurs between transmissions of said ring-alert message within said one antenna beam and transmission of said ring-alert message in said adjacent beams.

10. A method of reducing ring-alert power in a node in a communication system, said communication system includes a gateway that communicates with said node, said system providing a plurality of antenna beams, said method comprising the steps of:
    (a) identifying a set of antenna beams from said plurality of antenna beams in said communication system where a subscriber unit is likely to be located, the identifying step being performed by said gateway;
    (b) said node sequentially transmitting a ring-alert message within said antenna beams of said set of antenna beams using a sequence that maximizes time intervals between said ring-alert message transmitted in said adjacent antenna beams of said set of antenna beams, said ring-alert message being addressed to said subscriber unit; and
    (c) said node discontinuing the performance of step (b) when a response is received from said subscriber unit,
    wherein said set of antenna beams comprises several reuse groups of said antenna beams, and wherein the transmitting step further comprises the step of transmitting said ring-alert messages in one antenna beam of each of said reuse groups before transmitting said ring-alert message in other beams of said reuse groups.

11. A method as claimed in claim 1 further comprising the step of sending a list of said antenna beams identified in step (a) from said gateway to said node, wherein said list contains said ring-alert message and identifies said time intervals, said time intervals being pre-determined time delays between transmissions in said adjacent antenna beams.

12. A method as claimed in claim 11 wherein the sending step includes the step of sending a subscriber identifier uniquely identifying said subscriber unit.

13. A method as claimed in claim 1 wherein said transmitting step comprises the step of transmitting said ring-alert message which includes said time intervals from said node, said node being a part of an orbiting satellite.

14. A communication system that reduces ring-alert power comprising:
    a communication node that broadcasts within a plurality of antenna beams; and
    a gateway linked to said communication node by a communication channel, wherein
    said gateway has a processor for identifying which of said antenna beams a subscriber unit is likely to be located, wherein
    said communication node includes:
    a transceiver for sequentially transmitting a ring-alert message within said antenna beams of said plurality using a sequence that maximizes time intervals between said ring-alert message transmitted within other antenna beams of said plurality before transmitting in adjacent antenna beams of said plurality, said ring-alert message being addressed to said subscriber unit; and
    wherein said transceiver discontinues the transmission of said ring-alert message to said subscriber unit when a response is received from said subscriber unit.

15. A communication system as claimed in claim 14 wherein said gateway determines a geographic location where said subscriber unit resides and authenticates said geographic location for said subscriber unit.

16. A communication system as claimed in claim 15 wherein the gateway determines said geographic location based on a registration of said subscriber unit within said geographic location.

17. A communication system as claimed in claim 15 wherein said gateway identifies a set of said antenna beams of said plurality where said subscriber unit is likely to be located by correlating said geographic location of said subscriber unit to said plurality of antenna beams.

18. A communication system as claimed in claim 14 wherein said gateway includes a data storage for storing location data which includes said geographic location of said subscriber unit, and wherein said gateway determines said geographic location by querying said data storage.

19. A communication system as claimed in claim 18 wherein said transceiver includes:

a plurality of transmitters for sending said ring-alert message within said antenna beams identified by said gateway, and for transmitting said ring-alert message directed to said subscriber unit within one antenna beam of said plurality of antenna beams before transmitting said ring-alert message directed to said subscriber unit within other antenna beams of said plurality, wherein a time delay occurs between transmissions of said ring-alert message within said one antenna beam and on said antenna beams adjacent to said one beam, said one antenna beam being identified as where said subscriber unit is most likely to be located.

20. A method of reducing ring-alert power in a node of a communication system, said node having a plurality of antenna beams, said plurality of antenna beams including adjacent antenna beams, said method comprising the steps of:

said node sequentially transmitting a ring-alert message within said antenna beams of said plurality using a ring-alert sequence that maximizes time intervals between transmissions of said ring-alert message in said adjacent antenna beams of said plurality; and said node discontinuing the sequentially transmitting step when a response is received from a subscriber unit for which said ring-alert message is directed.

21. A method as claimed in claim 20 wherein the sequentially transmitting step further comprises the step of transmitting in other beams of said plurality before transmitting in adjacent beams of said plurality, wherein a time delay results between transmission of said ring-alert message within said adjacent antenna beams.

* * * * *

UNITED STATES PATENT AND TRADEMARK OFFICE
CERTIFICATE OF CORRECTION

PATENT NO. : 5,539,921
DATED : July 23, 1996
INVENTOR(S) : Daniel R. Tayloe

It is certified that error appears in the above-identified patent and that said Letters Patent is hereby corrected as shown below:

In column 13, claim 2, line 33, delete "." after "of".

Signed and Sealed this

Ninth Day of September, 1997

Attest:

BRUCE LEHMAN

*Attesting Officer*     *Commissioner of Patents and Trademarks*